United States Patent
Soliman et al.

(10) Patent No.: US 12,492,119 B2
(45) Date of Patent: Dec. 9, 2025

(54) COMMON MODE REJECTION STRUCTURES FOR MEMS DEVICES

(71) Applicant: NXP USA, Inc., Austin, TX (US)

(72) Inventors: Mostafa Soliman, Waterloo (CN); Aaron A. Geisberger, Austin, TX (US)

(73) Assignee: NXP USA, Inc., Austin, TX (US)

( * ) Notice: Subject to any disclaimer, the term of this patent is extended or adjusted under 35 U.S.C. 154(b) by 389 days.

(21) Appl. No.: 18/346,154

(22) Filed: Jun. 30, 2023

(65) Prior Publication Data

US 2025/0002331 A1    Jan. 2, 2025

(51) Int. Cl.
| | |
|---|---|
| B81B 7/02 | (2006.01) |
| B81C 1/00 | (2006.01) |
| G01C 19/574 | (2012.01) |

(52) U.S. Cl.
CPC ............ B81B 7/02 (2013.01); B81C 1/00166 (2013.01); G01C 19/574 (2013.01); B81B 2201/0242 (2013.01); B81B 2203/0163 (2013.01); B81B 2203/0307 (2013.01); B81B 2203/04 (2013.01); B81B 2203/06 (2013.01); B81C 2201/01 (2013.01)

(58) Field of Classification Search
None
See application file for complete search history.

(56) References Cited

U.S. PATENT DOCUMENTS

| | | | |
|---|---|---|---|
| 6,230,563 B1 | 5/2001 | Clark et al. | |
| 8,322,213 B2 | 12/2012 | Trusov et al. | |
| 8,844,357 B2 | 9/2014 | Scheben et al. | |
| 9,217,756 B2 | 12/2015 | Simon et al. | |
| 2015/0211854 A1* | 7/2015 | Ruohio | G01C 19/5712 73/504.12 |
| 2018/0010913 A1* | 1/2018 | Naumann | B81B 7/0016 |
| 2018/0180419 A1 | 6/2018 | Geisberger | |
| 2022/0163329 A1 | 5/2022 | Janioud et al. | |

FOREIGN PATENT DOCUMENTS

EP    4047308 A1    8/2022

OTHER PUBLICATIONS

U.S. Appl. No. 18/670,494, filed May 21, 2024, 34 pages.

* cited by examiner

*Primary Examiner* — Benjamin P Sandvik

(57) ABSTRACT

A MEMS device and method of forming the same includes paired masses suspended above a substrate includes linkages that couple pairs of masses to each other. Inner sense linkages couple interior edges of adjacent masses to each other. The inner sense linkages are configured to exhibit a first stiffness when the adjacent masses coupled to each inner sense linkage move out-of-phase relative to each other along a preferred axis of the inner sense linkages and to exhibit a second, increased stiffness in response to in-phase motion of the adjacent masses coupled to each inner sense linkage.

18 Claims, 5 Drawing Sheets

COMMON MODE REJECTION STRUCTURES FOR MEMS DEVICES

TECHNICAL FIELD

Embodiments of the subject matter described herein relate to microelectromechanical systems (MEMS) rotation rate sensors.

BACKGROUND

One approach to angular rate sensing in microelectromechanical systems (MEMS) involves causing a proof mass coupled to a substrate by one or more springs to oscillate along a chosen axis. When the substrate (along with the proof mass) experiences rotation, the motion of the proof mass will deviate from a straight path due to an apparent Coriolis force in a direction perpendicular to the axis of oscillation of the proof mass. This deflection of the proof mass can cause changes in the capacitance of an electrical circuit which is used to convert motion of the proof mass into electrical signals.

The reliability, accuracy and sensitivity of such MEMS rotation sensors can be improved by coupling multiple proof masses together and driving them such that they oscillate in opposite directions along a common axis, often referred to as "out-of-phase" or "anti-phase" motion. Such an arrangement can be used in a circuit that measures differential capacitance changes between the proof masses and appropriately configured sense electrodes. When masses driven out-of-phase experience the same rotation, they will experience similarly out-of-phase displacements in a direction perpendicular to the axis of oscillation. Meanwhile, if both masses experience an external force rather than rotation about the desired axis of rotation, they will move together and (ideally) no change in the differential capacitance signal will be measured.

SUMMARY

In an example embodiment, a MEMS device includes a substrate and includes first, second, third, and fourth masses suspended above the substrate. The first mass is directly adjacent to the second mass and the third mass. The second mass is directly adjacent to the first mass and the fourth mass. The third mass is directly adjacent to the first mass and the fourth mass. A first inner sense linkage is disposed between the first mass and the third mass and coupled to the first mass and the third mass. A second inner sense linkage is disposed between the second mass and the fourth mass and coupled to the second mass and the fourth mass. Each inner sense linkage includes an upper portion, a lower portion, and a central torsion flexure. The central torsion flexure has a first end coupled to the upper portion of the inner sense linkage and second end coupled to the lower portion of the inner sense linkage. A first torsion spring is coupled between the upper portion of the inner sense linkage and the lower portion of the inner sense linkage. A middle portion of the inner sense linkage coupled to the central torsion flexure at a location between the first end of the central torsion flexure and the second end of the central torsion flexure. When the upper and lower portions of the inner sense linkage move in phase with each other along an axis parallel to the central torsion flexure and the upper and lower portions of the inner sense linkage are displaced by a predetermined distance, the first torsion spring is configured to exhibit an increase in stiffness.

In another example embodiment, a method forming first, second, third, and fourth masses suspended above the substrate. The first mass is directly adjacent to the second mass and the third mass. The second mass is directly adjacent to the first mass and the fourth mass. The third mass is directly adjacent to the first mass and the fourth mass. The method further includes forming a first inner sense linkage and a second inner sense linkage. The first inner sense linkage is disposed between the first mass and the third mass and coupled to the first mass and the third mass. The second inner sense linkage is disposed between the second mass and the fourth mass and coupled to the second mass and the fourth mass. Each inner sense linkage includes an upper portion, a lower portion, and a central torsion flexure. The central torsion flexure has a first end coupled to the upper portion of the inner sense linkage and second end coupled to the lower portion of the inner sense linkage. A first torsion spring is coupled between the upper portion of the inner sense linkage and the lower portion of the inner sense linkage. A middle portion of the inner sense linkage coupled to the central torsion flexure at a location between the first end of the central torsion flexure and the second end of the central torsion flexure. When the upper and lower portions of the inner sense linkage move in phase with each other along an axis parallel to the central torsion flexure and the upper and lower portions of the inner sense linkage are displaced by a predetermined distance, the first torsion spring is configured to exhibit an increase in stiffness.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein.

DETAILED DESCRIPTION

Figure 1:
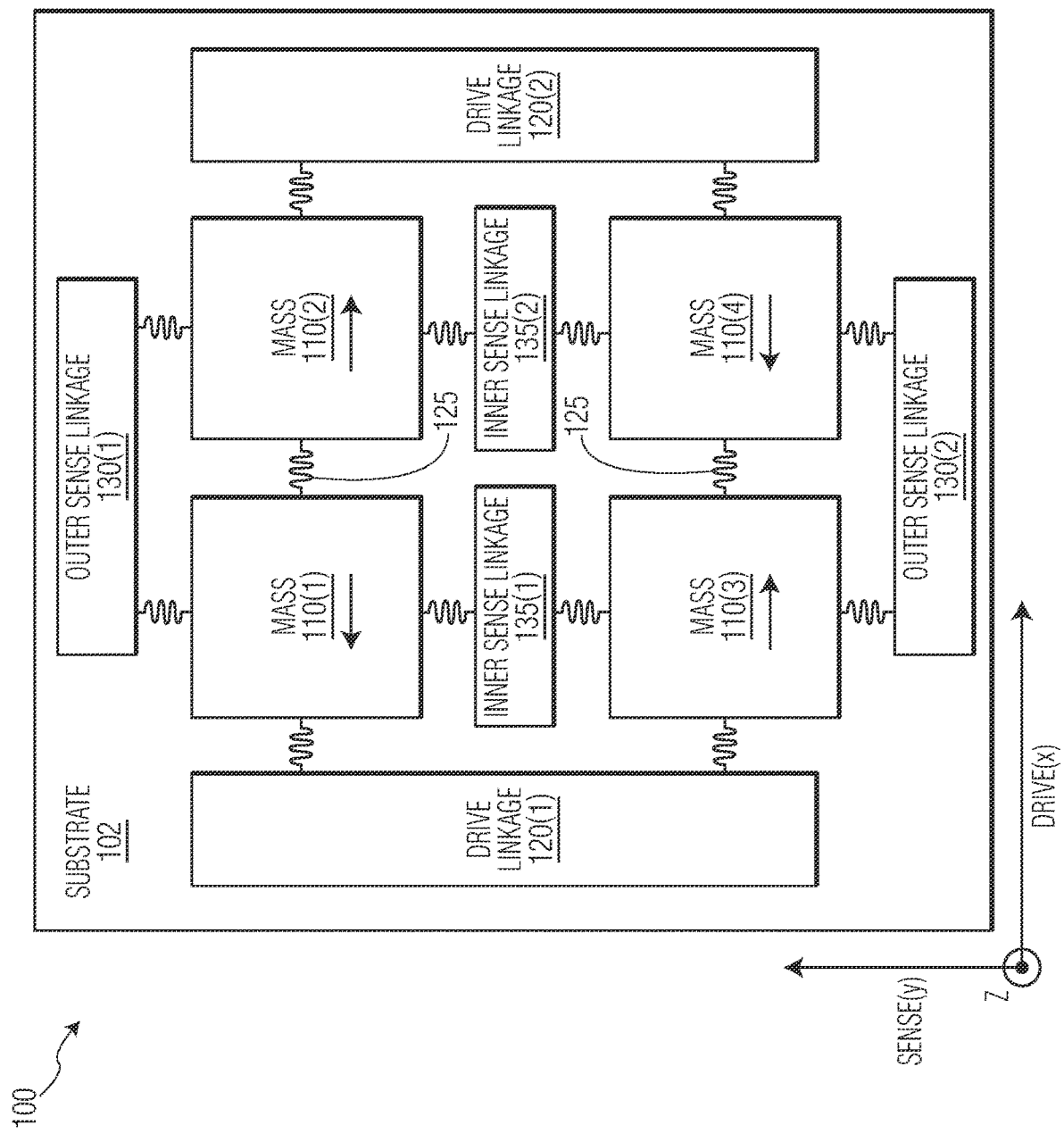
FIG. 1 is a plan view of a MEMS device suitable for use in a rotation rate sensor according to one or more embodiments.

The following detailed description provides examples for the purposes of understanding and is not intended to limit the invention or the application and uses of the same. Furthermore, there is no intention to be bound by any expressed or implied theory presented in the preceding technical field, background, or the following detailed description.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements or regions in the figures may be exaggerated relative to other elements or regions to help improve understanding of embodiments of the invention.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. The term "coupled," as used herein, is defined as directly or indirectly connected in an electrical or non-electrical manner. As used herein the terms "substantial" and "substantially" mean sufficient to accomplish the stated purpose in a practical manner and that minor imperfections, if any, are not significant for the stated purpose.

Directional references such as "top," "bottom," "left," "right," "above," "below," and so forth, unless otherwise stated, are not intended to require any preferred orientation and are made with reference to the orientation of the corresponding figure or figures for purposes of illustration or with reference to any other suitable orientations or axes.

It will be appreciated that the steps of various processes described herein are non-limiting examples of suitable processes according to embodiments and are for the purposes of illustration. Systems and devices according to embodiments herein may be use any suitable processes including those that omit steps described above, perform those steps and similar steps in different orders, and the like. It will also be appreciated that well-known features may be omitted for clarity.

Embodiments described herein provide MEMS rotation sensors in which proof masses are coupled to each other using coupling structures which are configured to exhibit high stiffness in response to undesired common mode ("in-phase") motion of adjacent proof masses while exhibiting lower stiffness in response to desirable out-of-phase motion of the proof masses. The stiffness of structures disclosed herein may be characterized in units of force per unit distance (e.g., Newtons per meter, pounds per inch, and the like) and measured using known measurement techniques.

FIG. 1 shows a schematic plan view of a MEMS device according to one or more embodiments which may be used as part of a rotation rate sensor (i.e., a MEMS gyroscope). The device 100 includes four proof masses (masses 110; i.e., the masses 110(1), 110(2), 110(3) and 110(4) formed on a substrate 102). The masses 110 are coupled to each other as shown, to drive linkages 120, to outer sense linkages 130, and to inner sense linkages 135. Inner drive linkages are represented by schematically by springs 125 and features of a such inner drive linkages may be seen in detail in FIG. 2 (see inner drive linkages 225).

The drive linkages 120(1) and 120(2) (along with inner drive linkages 125) can be actuated to drive the four masses 110 in an out-of-phase manner along the drive axis (X), in which each proof mass moves out-of-phase with each other directly adjacent proof mass. The arrow on each mass 110 indicate the relative direction of motion of that proof mass. For example, when the mass 110(1) moves in the −X direction, the mass 110(2) moves in the +X direction and vice versa. Similarly, when the mass 110(3) moves in the −X direction, the mass 110(4) moves in the +X direction and vice versa. The same out-of-phase relationship holds between the mass 110(1) and 110(3) and between the mass 110(2) and 110(4). When the device 100 experiences a rotation about the Z axis (perpendicular to the plane of FIG. 1), the proof masses will experience out-of-phase displacements along the sense axis Y, which can be sensed using any suitable methods, including capacitive measurements that are sensitive to displacement of each mass 110. Accordingly, it is desirable that various components of rotation rate sensors such as the device 100 resist in-phase motions of masses 110 along the sense axis Y because they would produce spurious signals that are not related to the desired measurand (rotation about the axis Z).

In the example of FIG. 1, motion of the masses 110 along the sense axis Y is constrained by the outer sense linkages 130 and the inner sense linkages 135. The masses 110(1) and 110(2) are coupled to each other and to the outer sense linkage 130(1). Similarly, the masses 110(3) and 110(4) are coupled to each other and to the outer sense linkage 130(2). The masses 110(1) and 110(3) are coupled to each other via the inner sense linkage 135(1) and the masses 110(2) and 110(4) are coupled to each other via the inner sense linkage 135(2).

As will be explained further below in reference to FIGS. 3-4, outer sense linkages such as the outer sense linkages 130 and/or inner sense linkages such as the inner sense linkages 135 according to embodiments herein cab exhibit greater stiffness in response to undesired in-phase motions of adjacent proof masses along the sense direction Y compared to the stiffness of these structures in response to out-of-phase motions of adjacent proof masses.

It will be understood that various linkages or couplings may be represented schematically by springs or other structures for the purposes of illustration and that any suitable structures may be used in embodiments herein.

Figure 2:
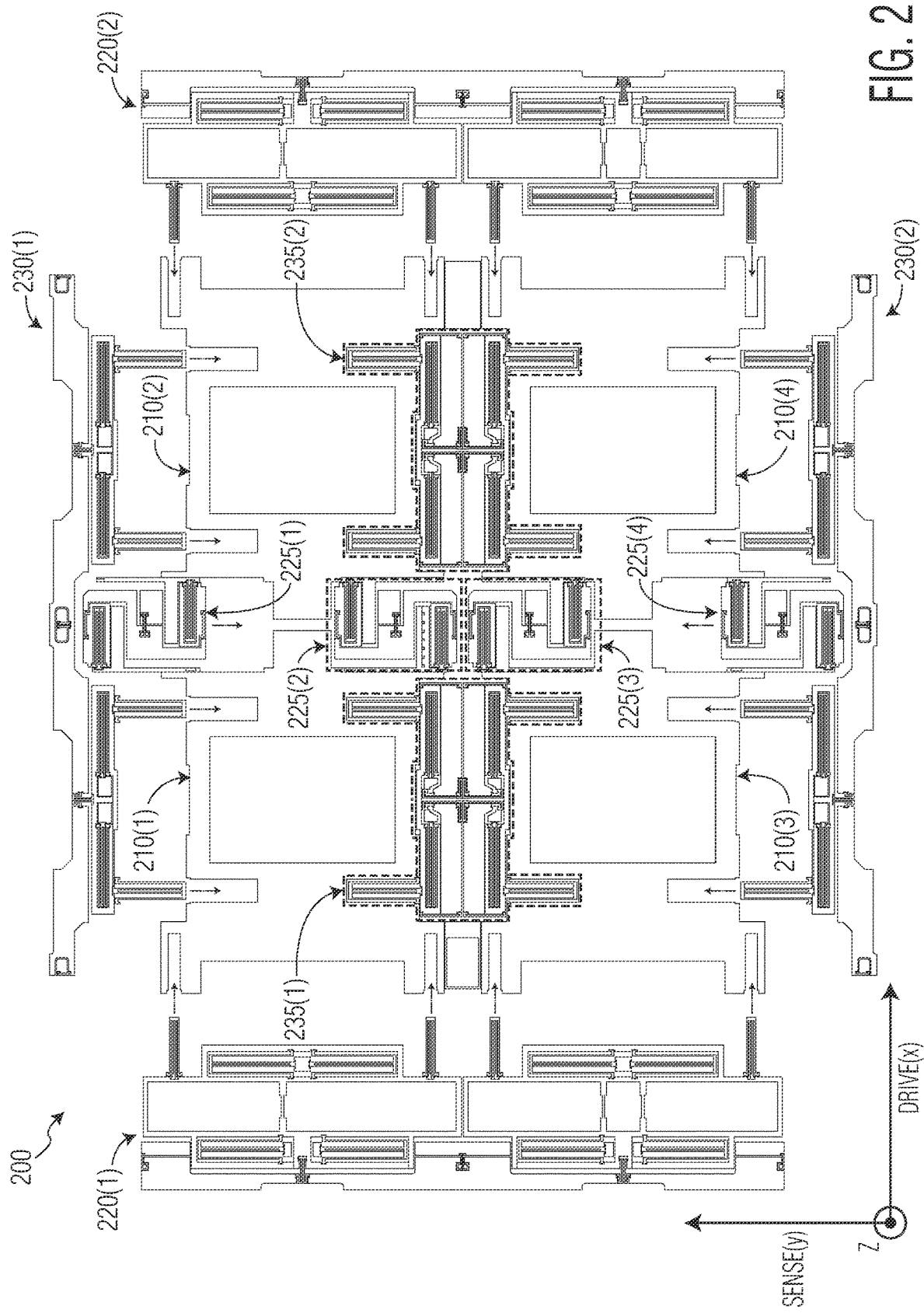
FIG. 2 is a detailed plan view of the device of FIG. 1.

FIG. 2 is a detailed plan view of an example device (e.g., the device 100 of FIG. 1). The device 200 has four proof masses (masses 210, e.g., masses 110) which are coupled to each other, a pair of drive linkages 220 (e.g., drive linkages 120), a pair of outer sense linkages 230 (e.g., outer sense linkages 130), and a pair of inner sense linkages 235 (e.g., inner sense linkages 135). Proof masses such as the masses 210 may have any suitable configurations. In the example of FIG. 2, each of the masses 210 features a central annular region that is suspended above an electrode array. When a mass 210 translates along the sense direction Y, the area of the mass 210 above the corresponding electrode area is changed and there is a corresponding change in the capacitance between the mass 210 and the electrode array. This capacitance change can be converted to an electrical signal and processed using known techniques to generate a signal corresponding to rotation experienced by the device 200.

Figure 3:
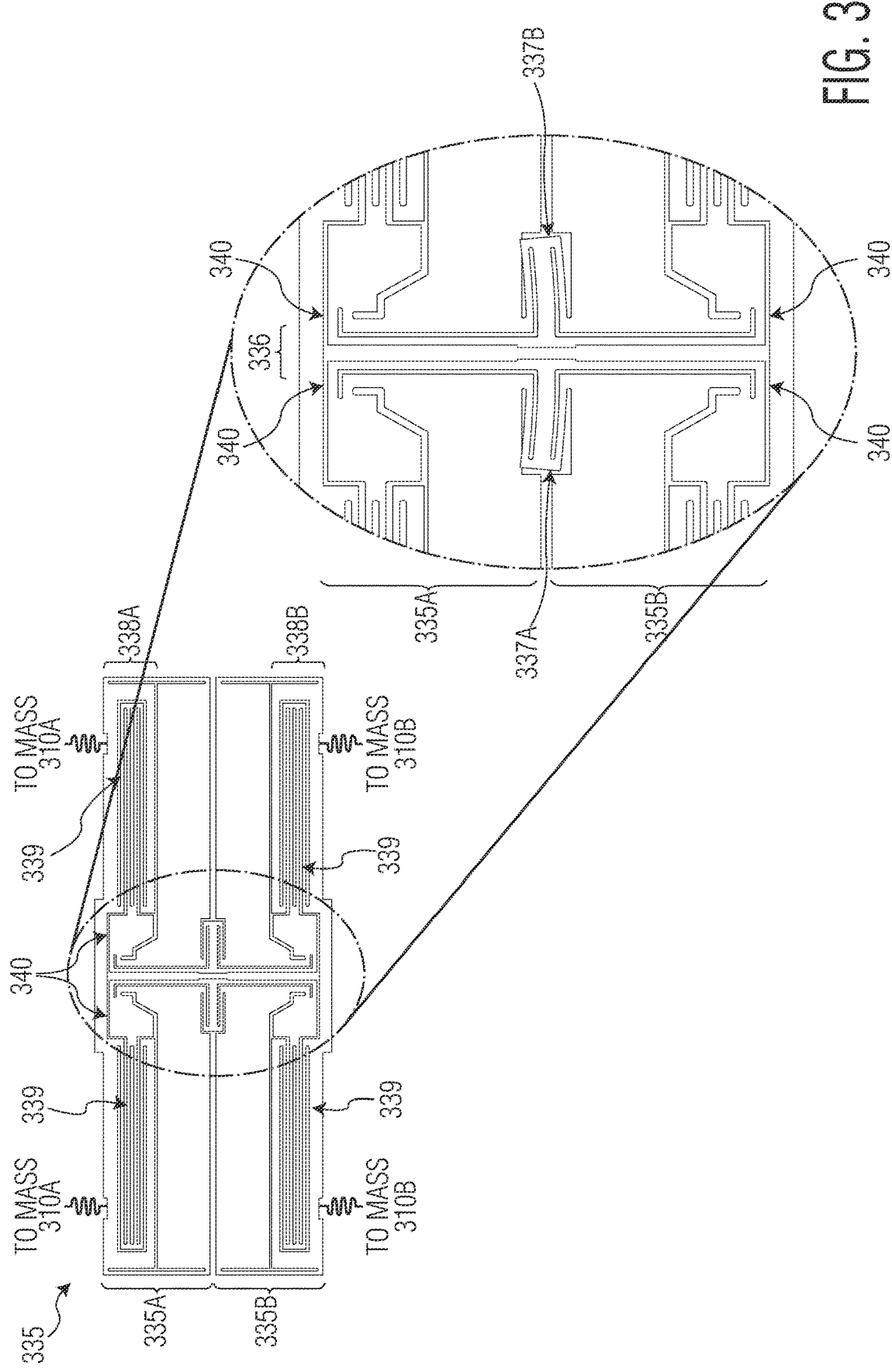
FIG. 3 is a plan view shows further details of an inner sense linkage of the device of FIG. 1 and FIG. 2 in two different configurations.

FIG. 3 is a plan view of an inner sense linkage 335 (e.g., an inner sense linkage 135 or an inner sense linkage 235) that forms part of a MEMS device in one or more embodiments. The inner sense linkage 335 has an upper portion 335A and a lower portion 335B. Each portion of the of the inner sense linkage 335 is configured to be coupled to a proof mass (e.g., a mass 110 or a mass 210). The upper portion 335A and the lower portion 335B of the inner sense linkage 335 are joined by a central torsion flexure 336 that defines a central axis of the inner sense linkage 335. Two torsion springs 337 (the torsion spring 337A and the torsion spring 337B) extend from either side of a middle portion of the central torsion flexure 336. In this example, the torsion springs 337 are serpentine springs with ends that are coupled to the upper portion 335A and the lower portion 335B of the inner sense linkage 335 and a central portion that extends away from the central torsion flexure 336.

A first lateral flexure 338A is oriented perpendicularly to the central torsion flexure 336 and extends from a first end of the central torsion flexure 336. The first lateral flexure 338A couples the central torsion flexure 336 to a mass corresponding to the upper portion 335A of the inner sense linkage 335 (e.g., one of the masses 210 as shown in FIG. 2) via two arms. Each arm includes a folded spring 339 with a first end coupled to the first end of the central torsion flexure 336 and a second end coupled to the mass 310A (e.g., one of the masses 110, 210, not shown in FIG. 3) corresponding to the upper portion 335A of the inner sense linkage 335. For simplicity portions of the inner sense linkage 335 coupling folding springs 339 to the mass 310A are depicted schematically as simple springs (see the springs 236 as depicted in FIG. 2).

Similarly to the first lateral flexure 338A, a second lateral flexure 338B is oriented perpendicularly to the central torsion flexure 336 and extends from a second end of the central torsion flexure 336. The second lateral flexure 338B couples the central torsion flexure 336 to a mass corresponding to the lower portion 335B of the inner sense linkage 335 (e.g., another of the masses 210 as shown in FIG. 2 via two arms. Each arm includes a folded spring 339 with a first end coupled to the second end of the central torsion flexure 336 and a second end coupled to the mass 310B (e.g., one of the masses 110, 210, not shown in FIG. 3) corresponding to the lower portion 335B of the inner sense linkage 335. For simplicity portions of the inner sense linkage 335 coupling folded springs 339 to the mass 310B are depicted schematically as simple springs (see the springs 236 as depicted in FIG. 2).

The first lateral flexure 338A and the second lateral flexure 338B are coupled to the central torsion flexure 336 via beams 340. Overall, the first lateral flexure 338A and the second lateral flexure 338B are configured to decouple the motions of masses coupled to each inner sense linkage 335 along the drive axis (X) from their motion along the sense axis (Y). That is, the beams 340 are configured to relieve stresses which would result if the central torsion flexure 336 were rigidly coupled to the upper portion 335A and the portion 335B. This arrangement allows the inner sense linkage 335 to deform to in response to out-of-phase motion of the upper portion 335A and the lower portion 335B (due to the motion of masses coupled to those portions) of the inner sense linkage 335 without inducing excessive stress in the central torsion flexure 336 which could result in mechanical failure of the central torsion flexure 336.

As shown in the inset view indicated by the arrow 399, the torsion springs 337 are configured such that, when the upper portion 335A of the inner sense linkage 335 is displaced in the same direction as the lower portion 335B (i.e., when the mass 310A coupled to the upper portion 335A experiences in-phase displacement in the sense direction relative to the mass 310B coupled to the lower portion 335B), the torsion springs 337 can strike either the upper portion 335A of the inner sense linkage 335 as shown or the lower portion 335B of the inner sense linkage 335. The effective stiffness of the inner sense linkage 335 is thus increased when the upper portion 335A and the lower portion 335B move in phase with each other and, in one or more embodiments, the stiffness increases further if the displacement of the masses coupled to the linkage exceeds a predetermined limit, such that one or both torsion springs 337 strike the upper portion 335A or the lower portion 335B of the inner sense linkage 335.

It will be appreciated that features of linkages according to embodiments herein such as the inner sense linkage 335 can provide devices such as the device 100 or the device 200 with improved resistance to undesired in-phase motion of structures such as proof masses used in MEMS-based rotation sensors (e.g., masses 110, 210). In one or more embodiments, an inner sense linkage (e.g., an inner sense linkage 135, 235, or 335) coupled to two masses (e.g., masses 110, 210) exhibits a stiffness in response to in-phase motion of the masses that is at least four times its stiffness in response to out of phase motion of the masses. In one or more such embodiments, the stiffness of the inner sense linkage in response to in-phase motion of the masses is between four and twelve times its stiffness in response to out-of-phase motion of the masses. In one or more other embodiments, such an inner sense linkage exhibits a stiffness in response to in-phase motion of the masses that is greater than twelve times its stiffness in response to out of phase motion of the masses. It will be further appreciated that when inner sense linkages such as the inner sense linkage 335 are coupled to masses and arranged as depicted in FIG. 1 and FIG. 2 that the inner sense linkages will act to decouple motion of masses such as masses 110, 210 along the drive direction (the axis X in FIGS. 1-5) from motion along the sense direction (the axis Y in FIGS. 1-5). Furthermore, the inner sense linkages will exhibit greater stiffness in response to in-phase motion of adjacent masses coupled to each inner sense linkage in the sense direction than the stiffness exhibited in response to out-of-phase motions of adjacent masses coupled to the same inner sense linkage along the sense direction.

Figure 4:
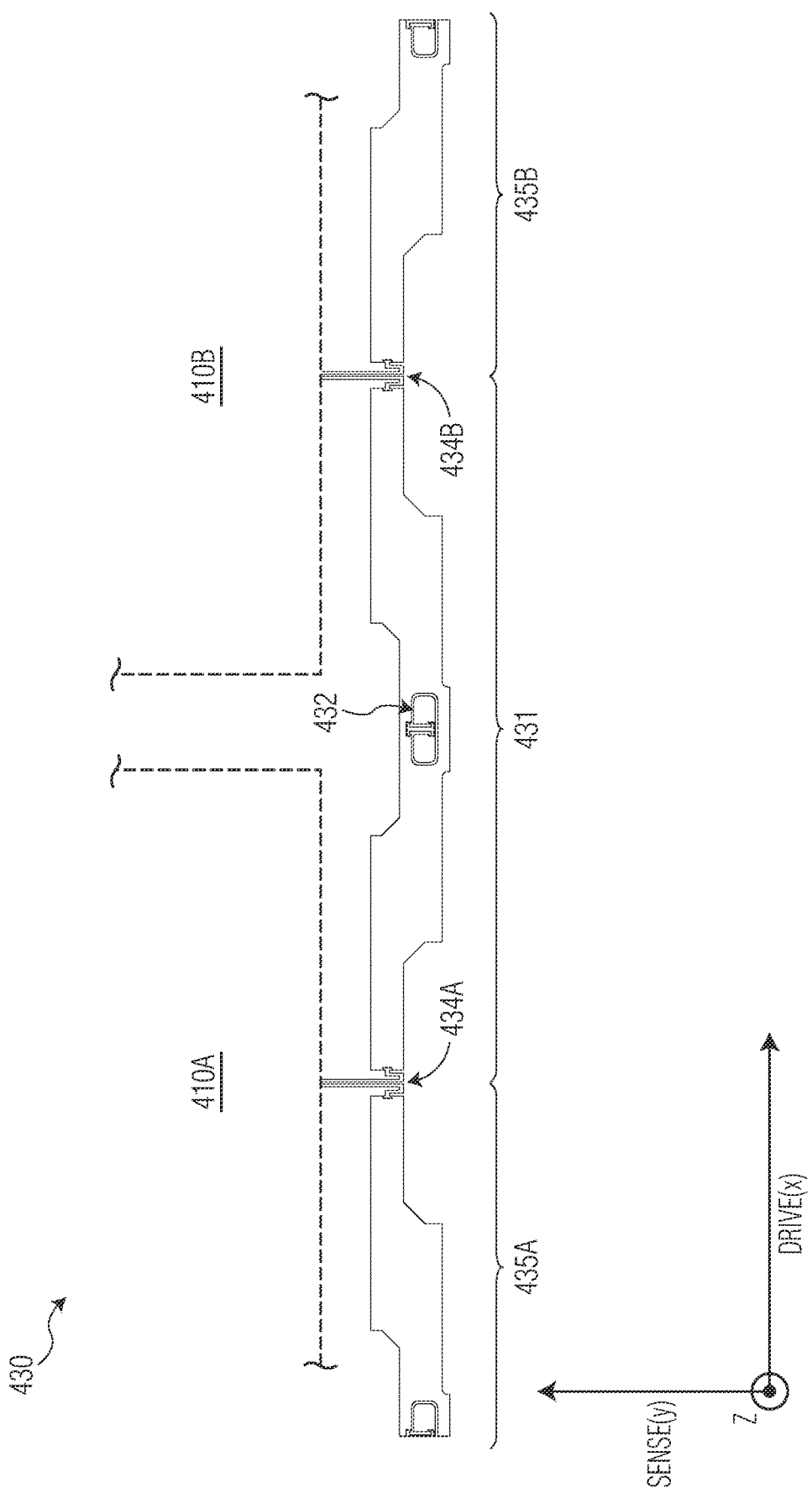
FIG. 4 is a plan view showing further details of an outer sense linkage of the device of FIG. 1 and FIG. 2.

FIG. 4 illustrates an outer sense linkage 430 (e.g., an outer sense linkage 130 or an outer sense linkage 230) that forms part of a MEMS device in one or more embodiments. The outer sense linkage 430 has a central portion 431 that is coupled between two outer portions 435 (outer portions 435A, 435B). Each portion of the outer sense linkage 430 is coupled to a substrate (not shown) such as the substrate 102 by a corresponding anchor. It will be understood that the arrangement of the various portions of the outer sense linkage 430 and the corresponding anchors can confer various advantages as described further below.

The central portion 431 of the outer sense linkage 430 is coupled to the substrate by the anchor 432, which is disposed inside the footprint of the central portion 431 and extends within an aperture in the central portion 431. In one or more embodiments, an anchor such as the anchor 432 may be disposed at a location that overlaps or otherwise coincides with a center of mass of a linkage such as the outer sense linkage 430.

Each outside portion 435 of the outer sense linkage 430 (i.e., the outer portions 435A, 435B) has an end that is proximal to the central portion 431 and coupled to the central portion 431 by a corresponding spring or other suitable linkage (i.e., the springs 434A, 434B couple the respective outer portions 435A, 435B to the central portion 431). The corresponding distal ends of the outer portions 435 are coupled to the substrate by corresponding anchors 436 (i.e., the anchors 436A, 436B couple the respective outer portions 435A, 435B to the substrate). As shown, the anchors 436A, 436B are disposed within the footprint of the corresponding outer portions 435A, 435B.

The central portion 431, and outer portions 435 of the outer sense linkage 430 are coupled to the corresponding anchors using any suitably flexible linkages that allows these portions to move with respect to one another. As a result, the central portion 431 is configured to pivot about the anchor 432 and the outer portions 435 are configured to pivot about their corresponding anchors 436. However, the motions of the individual portions of the outer sense linkage 430 are constrained because they are linked together by the springs 434A, 434B.

The masses of the outer sense linkage 430 are configured, together with placement of the springs and anchors of the outer sense linkage 430 such that the outer sense linkage 430 exhibits greater stiffness in response to in-phase motion of the outer portions 435 than the stiffness exhibited in response to out-of-phase motions. Accordingly, in one or more embodiments, outer portions of a linkage such as the outer sense linkage 430 (e.g., outer portions 435) are coupled to adjacent proof masses in a MEMS device suitable for use in a rotation sensor (e.g., as an outer sense linkage 130 of the device 100, or as an outer sense linkage 230 of the device 200).

For example, when a first mass 410A is coupled to the outer portion 435A via the spring 434A and a second mass 410B is coupled to the outer portion 435B via the spring 434B as shown, the outer sense linkage 430 will tend to resist in-phase motion of the masses 410A, 410B. This is because the central portion 431 of the outer sense linkage 430 is configured to pivot about the anchor 432, while the outer portions 435A, 435B are configured to pivot about the respective anchors 436A, 436B. If the masses 410A, 410B are translated in the same direction along the sense axis 'Y' (and by the same amount), the central portion 431 will not pivot or flex significantly while the ends of the outer portions 435 proximal to the central portion 431 will flex away from the central portion 431, causing the springs 434 to extend and exert a restoring force that opposes the displacement of the masses 410A, 410B, along with the stiffness of the outer portions 435A, 435B. Meanwhile, if the masses 410A, 410B move in opposite the directions, the central portion 431 will flex about the anchor 432 and the proximal ends of each outer portion 435 will flex together with the motion of the central portion 431, reducing the extension of each spring 434 (thus reducing the restoring force exerted by the springs 434 opposing the displacements of the masses 410A, 410B and flexing of the central portion 431 and outer portions 435 of the outer sense linkage 430) compared to the extension of each spring 434 when the masses are displaced in the same direction.

In addition, the centered placement of the anchor 432 within the footprint of the central portion 431 of outer sense linkage 430, together with the coupling between the central portion 431 and the outer portions 435 which are anchored at their distal ends results in a structure that exhibits high stiffness under forces that are applied along the 'X axis'. Thus, the outer sense linkage 430 will exhibit improved resistance unwanted motion along the 'Y' axis induced by forces directed along the 'X' axis when compared to structures used for similar purposes which have anchors placed farther away from the center of mass (often outside the footprint of the structure) and which include only a single section similar to the central portion 431 of the outer sense linkage 430.

In one or more embodiments, an outer sense linkage (e.g., an outer sense linkage 130, 230, or 430) coupled to two masses (e.g., masses 110, 210) exhibits a stiffness in response to in-phase motion of the masses that is at least four times its stiffness in response to out of phase motion of the masses. In one or more such embodiments, the stiffness of the outer sense linkage in response to in-phase motion of the masses is between four and twelve times its stiffness in response to out-of-phase motion of the masses. In one or more other embodiments, such an outer sense linkage exhibits a stiffness in response to in-phase motion of the masses that is greater than twelve times its stiffness in response to out of phase motion of the masses.

In certain previous approaches utilizing four masses (e.g., masses 110 or 210), each mass is coupled to an independent outer sense linkage. It will be appreciated that the use of single outer sense linkages (e.g., outer sense linkages 430) having three portions coupled together and anchored to a substrate as shown in FIG. 4 can convey various advantages, such as higher stiffness over previous approaches. As a result, translation and bending the rigid portions of such a linkage can be lower than in previous approaches, resulting in lower induced stresses and better reliability when a device such as the device 200 incorporating outer sense linkages according to embodiments herein experiences large shocks.

Figure 5:
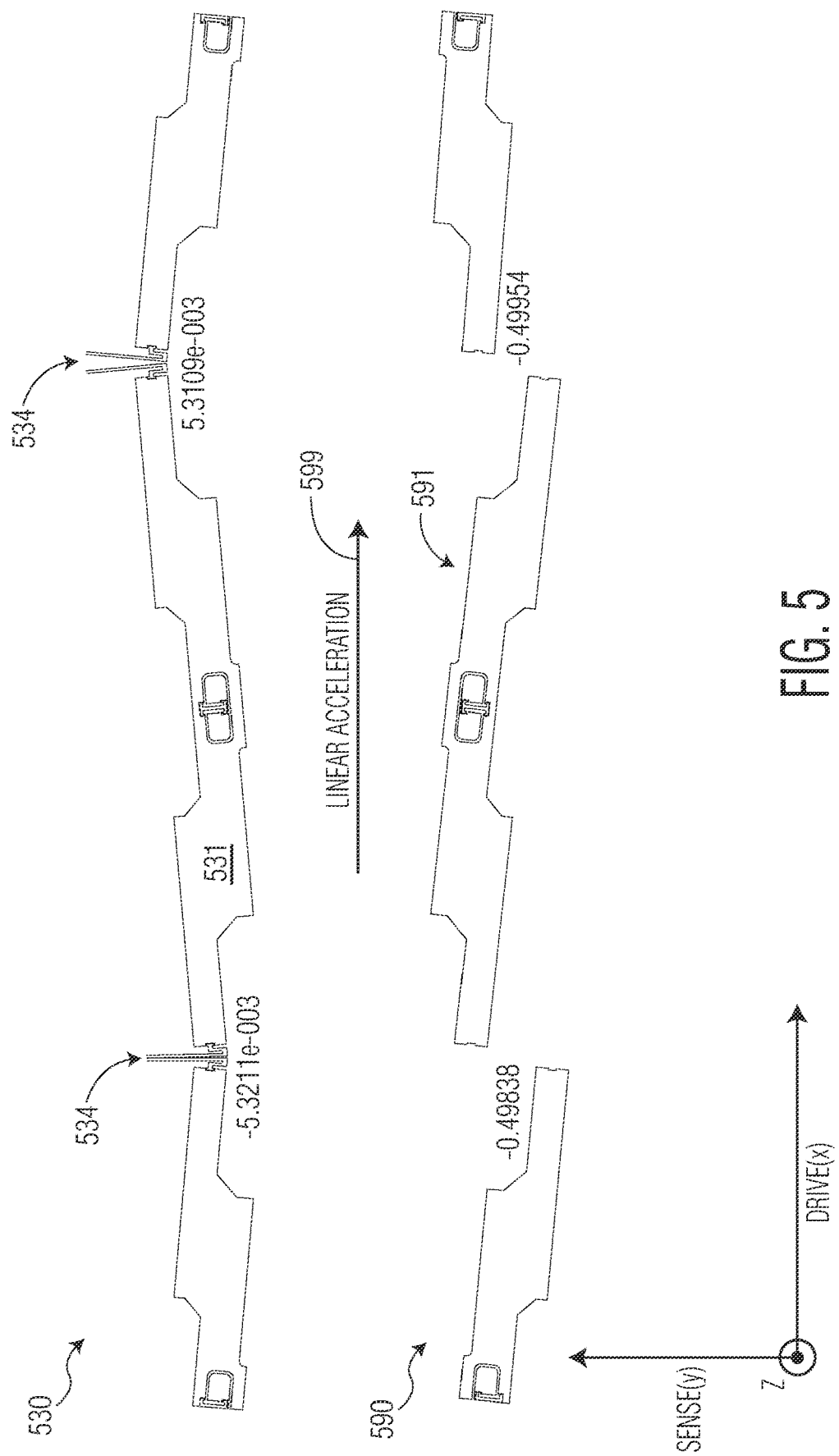
FIG. 5 depicts simulation results comparing performance of an outer sense linkage according to embodiment herein to another outer sense linkage.

FIG. 5 is a graph comparing maximum deformation values in response to a linear acceleration in the direction indicated by the arrow 599 for two outer sense linkage structures. The outer sense linkage 530 is an outer sense linkage according to embodiments herein (e.g., an outer sense linkage 230 or 430) with a central portion 531 coupled via spring 534 to outer portion 535. The outer sense linkage 590 includes a central portion 591 that is not similarly coupled to two outer portions. As shown, the maximum displacement of the outer sense linkage 530 is approximately two orders of magnitude lower than the maximum displacement at the corresponding location of the outer sense linkage 590 in response to the same acceleration.

Example Embodiments

Features of embodiments may be understood by way of one or more of the following examples:

Example 1: A device or method that includes first, second, third, and fourth masses suspended above a substrate. The first mass is directly adjacent to the second mass and the third mass. The second mass is directly adjacent to the first mass and the fourth mass. The third mass is directly adjacent to the first mass and the fourth mass. A first inner sense linkage is disposed between the first mass and the third mass and coupled to the first mass and the third mass. A second inner sense linkage is disposed between the second mass and the fourth mass and coupled to the second mass and the fourth mass. Each inner sense linkage includes an upper portion, a lower portion, and a central torsion flexure. The central torsion flexure has a first end coupled to the upper portion of the inner sense linkage and second end coupled to the lower portion of the inner sense linkage. A first torsion spring is coupled between the upper portion of the inner sense linkage and the lower portion of the inner sense linkage. A middle portion of the inner sense linkage coupled to the central torsion flexure at a location between the first end of the central torsion flexure and the second end of the central torsion flexure. When the upper and lower portions of the inner sense linkage move in phase with each other along an axis parallel to the central torsion flexure and the upper and lower portions of the inner sense linkage are displaced by a predetermined distance, the first torsion spring is configured to exhibit an increase in stiffness.

Example 2: The device or method of any of Example 1, where, when the upper and lower portions of the inner sense linkage move in phase with each other along the axis parallel to the central torsion flexure and the upper and lower portions of the inner sense linkage are displaced by a predetermined distance, the first torsion spring is configured to strike one or both of the upper portion of the inner sense linkage and the lower portion of the inner sense linkage.

Example 3: The device or method of Example 1 or Example 2 where each inner sense linkage also includes a second torsion spring. The second torsion spring is coupled between the upper portion of the inner sense linkage and the lower portion of the inner sense linkage and opposite the first torsion spring. The second torsion spring has a middle portion coupled to the central torsion flexure at a location between the first end of the central torsion flexure and the second end of the central torsion flexure. When the upper and lower portions of the inner sense linkage move in phase with each other along an axis parallel to the central torsion flexure and the upper and lower portions of the inner sense linkage are displaced by a predetermined distance, the second torsion spring is configured to strike one or both of the upper portion of the inner sense linkage and the lower portion of the inner sense linkage.

Example 4: the device or method of any of Examples 1-3 where each inner sense linkage also includes a first lateral flexure and a second lateral flexure. The first lateral flexure is oriented perpendicular to the central torsion flexure and couples the first end of the central torsion flexure to a mass corresponding to the upper portion of that inner sense linkage. The second lateral torsion flexure is oriented perpendicular to the central torsion flexure and couples the second end of the central torsion flexure to a mass corresponding to the lower portion of that inner sense linkage. Each lateral flexure has first and second arms that include respective folded springs. A middle portion of each folded spring of the first lateral flexure is coupled to the first end of the central torsion flexure and outer portions of each folded spring of the first lateral flexure are coupled to the mass corresponding to the upper portion of that inner sense linkage. A middle portion of each folded spring of the second lateral flexure is coupled to the second end of the central torsion flexure and outer portions of each folded spring of the second lateral flexure are coupled to the mass corresponding to the lower portion of that inner sense linkage.

Example 5: The device or method of any of Examples 1-4 that also includes a first outer sense linkage that is coupled to second outer edges of the first mass and the second mass; and a second outer sense linkage that is opposite the first outer sense linkage and coupled to second outer edges of the third mass and the fourth mass. Each outer sense linkage includes a central portion anchored to the substrate via an anchor that is surrounded by the central portion; a first outer portion having a distal portion anchored to the substrate and a proximal end coupled to the central portion via a first spring element; and a second outer portion having a distal portion anchored to the substrate and a proximal end coupled to the central portion via a second spring element.

Example 6: The device or method of Example 5 where the first outer portion of the first outer sense linkage is coupled to the first mass via the first spring element of the first outer sense linkage and the second outer portion of the first outer sense linkage is coupled to the second mass via the second spring element of the first outer sense linkage. The first outer sense linkage is configured to exhibit a first stiffness value in response to out-of-phase motion of the first mass with respect to the second mass. The first outer sense linkage is configured to exhibit a second stiffness value that is greater than the first stiffness value in response to in-phase motion of the first mass with respect to the second mass.

Example 7: the device or method of Example 5 or Example 6, where the first outer portion of the second outer sense linkage is coupled to the third mass via the first spring element of the second outer sense linkage and the second outer portion of the second outer sense linkage is coupled to the fourth mass via the second spring element of the second outer sense linkage. The second outer sense linkage is configured to exhibit a third stiffness value in response to out-of-phase motion of the third mass with respect to the fourth mass. The second outer sense linkage is configured to exhibit a fourth stiffness value that is greater than the third stiffness value in response to in-phase motion of the third mass with respect to the fourth mass.

Example 8: The device or method of Example 7 where the first second stiffness value is at least 4 times greater than the first stiffness value.

Example 9: The device or method of any of Example 7 or Example 8 where the fourth stiffness value is at least 4 times greater than the third stiffness value.

Example 10: A device or method that includes first, second, third, and fourth masses suspended above a substrate. The first mass is directly adjacent to the second mass and the third mass. The second mass is directly adjacent to the first mass and the fourth mass. The third mass is directly adjacent to the first mass and the fourth mass. A first inner sense linkage is disposed between the first mass and the third mass and coupled to the first mass and the third mass. A second inner sense linkage is disposed between the second mass and the fourth mass and coupled to the second mass and the fourth mass. The Example also include a first outer sense linkage that is coupled to second outer edges of the first mass and the second mass; and a second outer sense linkage that is opposite the first outer sense linkage and coupled to second outer edges of the third mass and the fourth mass. Each outer sense linkage includes: a central portion anchored to the substrate via an anchor that is surrounded by the central portion; a first outer portion having a distal portion anchored to the substrate and a proximal end coupled to the central portion via a first spring element; and a second outer portion having a distal portion anchored to the substrate and a proximal end coupled to the central portion via a second spring element.

Example 11: The device or method of any of Examples 1-10 where each inner sense linkage comprises includes an upper portion; a lower portion; a central torsion flexure having a first end coupled to the upper portion of the inner sense linkage and second end coupled to the lower portion of the inner sense linkage; and a first torsion spring coupled between the upper portion of the inner sense linkage and the lower portion of the inner sense linkage; and having a middle portion coupled to the central torsion flexure at a location between the first end of the central torsion flexure and the second end of the central torsion flexure. When the upper and lower portions of the inner sense linkage move in phase with each other along an axis parallel to the central torsion flexure and the upper and lower portions of the inner sense linkage are displaced by a predetermined distance, the first torsion spring is configured to exhibit an increase in stiffness.

Example 12: The device or method of any of Examples 1-11 where the first outer portion of each outer sense linkage is coupled to a first respective mass via the first spring element of that outer sense linkage and the second outer portion of each outer sense linkage is coupled to a second corresponding mass via the second spring element of that outer sense linkage. Each outer sense linkage is configured to exhibit a first stiffness value in response to out-of-phase motion of the first respective mass with respect to the second respective mass. Each first outer sense linkage is configured to exhibit a second stiffness value that is greater than the first stiffness value in response to in-phase motion of the first respective mass relative to the second respective mass.

The preceding detailed description and examples are merely illustrative in nature and are not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

It should be understood that this invention is not limited in its application to the details of construction and the arrangement of components set forth in the preceding description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The preceding discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The preceding detailed description is to be read with reference to the figures, in which like elements in different figures have like reference numerals. The Figures, which are not necessarily to scale, depict selected embodiments and are not intended to limit the scope of embodiments of the invention. Skilled artisans will recognize the examples provided herein have many useful alternatives and fall within the scope of embodiments of the invention.

The connecting lines shown in the various figures contained herein are intended to represent exemplary functional relationships and/or physical couplings between the various elements. It should be noted that many alternative or additional functional relationships or physical connections may be present in one or more embodiments of the subject matter. In addition, certain terminology may also be used herein for the purpose of reference only, and thus are not intended to be limiting, and the terms "first," "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in one or more embodiments of the depicted subject matter.

What is claimed is:

1. A microelectromechanical system (MEMS) device comprising:
    a substrate;
    first, second, third, and fourth masses suspended above the substrate, wherein:
        the first mass is directly adjacent to the second mass and the third mass;
        the second mass is directly adjacent to the first mass and the fourth mass; and
        the third mass is directly adjacent to the first mass and the fourth mass;
    a first inner sense linkage that is disposed between the first mass and the third mass and coupled to the first mass and the third mass; and
    a second inner sense linkage that is disposed between the second mass and the fourth mass and coupled to the second mass and the fourth mass;
    wherein each inner sense linkage comprises:
        an upper portion;
        a lower portion;
        a central torsion flexure having a first end coupled to the upper portion of the inner sense linkage and second end coupled to the lower portion of the inner sense linkage; and
        a first torsion spring coupled between the upper portion of the inner sense linkage and the lower portion of the inner sense linkage; and having a middle portion coupled to the central torsion flexure at a location between the first end of the central torsion flexure and the second end of the central torsion flexure; and
        wherein, when the upper and lower portions of the inner sense linkage move in phase with each other along an axis parallel to the central torsion flexure and the upper and lower portions of the inner sense linkage are displaced by a predetermined distance, the first torsion spring is configured to exhibit an increase in stiffness.

2. The MEMS device of claim 1, wherein, when the upper and lower portions of the inner sense linkage move in phase with each other along the axis parallel to the central torsion flexure and the upper and lower portions of the inner sense linkage are displaced by a predetermined distance, the first torsion spring is configured to strike one or both of the upper portion of the inner sense linkage and the lower portion of the inner sense linkage.

3. The MEMS device of claim 1, wherein each inner sense linkage further comprises:
    a second torsion spring coupled between the upper portion of the inner sense linkage and the lower portion of the inner sense linkage and opposite the first torsion spring; and having a middle portion coupled to the central torsion flexure at a location between the first end of the central torsion flexure and the second end of the central torsion flexure;

wherein, when the upper and lower portions of the inner sense linkage move in phase with each other along an axis parallel to the central torsion flexure and the upper and lower portions of the inner sense linkage are displaced by a predetermined distance, the second torsion spring is configured to strike one or both of the upper portion of the inner sense linkage and the lower portion of the inner sense linkage.

4. The MEMS device of claim 3 wherein each inner sense linkage further comprises:
   a first lateral flexure oriented perpendicular to the central torsion flexure that couples the first end of the central torsion flexure to a mass corresponding to the upper portion of that inner sense linkage; and
   a second lateral torsion flexure oriented perpendicular to the central torsion flexure that couples the second end of the central torsion flexure to a mass corresponding to the lower portion of that inner sense linkage;
   wherein each lateral flexure has first and second arms that include respective folded springs;
   wherein a middle portion of each folded spring of the first lateral flexure is coupled to the first end of the central torsion flexure and outer portions of each folded spring of the first lateral flexure are coupled to the mass corresponding to the upper portion of that inner sense linkage; and
   wherein a middle portion of each folded spring of the second lateral flexure is coupled to the second end of the central torsion flexure and outer portions of each folded spring of the second lateral flexure are coupled to the mass corresponding to the lower portion of that inner sense linkage.

5. The MEMS device of claim 1, further comprising:
   a first outer sense linkage that is coupled to second outer edges of the first mass and the second mass; and
   a second outer sense linkage that is opposite the first outer sense linkage and coupled to second outer edges of the third mass and the fourth mass;
   wherein each outer sense linkage comprises:
      a central portion anchored to the substrate via an anchor that is surrounded by the central portion;
      a first outer portion having a distal portion anchored to the substrate and a proximal end coupled to the central portion via a first spring element; and
      a second outer portion having a distal portion anchored to the substrate and a proximal end coupled to the central portion via a second spring element.

6. The MEMS device of claim 5,
   wherein the first outer portion of the first outer sense linkage is coupled to the first mass via the first spring element of the first outer sense linkage and the second outer portion of the first outer sense linkage is coupled to the second mass via the second spring element of the first outer sense linkage;
   wherein the first outer sense linkage is configured to exhibit a first stiffness value in response to out-of-phase motion of the first mass with respect to the second mass; and
   wherein the first outer sense linkage is configured to exhibit a second stiffness value that is greater than the first stiffness value in response to in-phase motion of the first mass with respect to the second mass.

7. The MEMS device of claim 6,
   wherein the first outer portion of the second outer sense linkage is coupled to the third mass via the first spring element of the second outer sense linkage and the second outer portion of the second outer sense linkage is coupled to the fourth mass via the second spring element of the second outer sense linkage;
   wherein the second outer sense linkage is configured to exhibit a third stiffness value in response to out-of-phase motion of the third mass with respect to the fourth mass; and
   wherein the second outer sense linkage is configured to exhibit a fourth stiffness value that is greater than the third stiffness value in response to in-phase motion of the third mass with respect to the fourth mass.

8. The MEMS device of claim 7,
   wherein the first second stiffness value is at least 4 times greater than the first stiffness value.

9. The MEMS device of claim 8,
   wherein the fourth stiffness value is at least 4 times greater than the third stiffness value.

10. A method comprising:
    forming first, second, third, and fourth masses suspended above a substrate, wherein:
       the first mass is directly adjacent to the second mass and the third mass;
       the second mass is directly adjacent to the first mass and the fourth mass; and
       the third mass is directly adjacent to the first mass and the fourth mass;
    forming a first inner sense linkage that is disposed between the first mass and the third mass and coupled to the first mass and the third mass; and
    forming a second inner sense linkage that is disposed between the second mass and the fourth mass and coupled to the second mass and the fourth mass;
    wherein each inner sense linkage comprises:
       an upper portion;
       a lower portion;
       a central torsion flexure having a first end coupled to the upper portion of the inner sense linkage and second end coupled to the lower portion of the inner sense linkage; and
       a first torsion spring coupled between the upper portion of the inner sense linkage and the lower portion of the inner sense linkage; and having a middle portion coupled to the central torsion flexure at a location between the first end of the central torsion flexure and the second end of the central torsion flexure; and
    wherein, when the upper and lower portions of the inner sense linkage move in phase with each other along an axis parallel to the central torsion flexure and the upper and lower portions of the inner sense linkage are displaced by a predetermined distance, the first torsion spring is configured to exhibit an increase in stiffness.

11. The method of claim 10, wherein, when the upper and lower portions of the inner sense linkage move in phase with each other along the axis parallel to the central torsion flexure and the upper and lower portions of the inner sense linkage are displaced by a predetermined distance, the first torsion spring is configured to strike one or both of the upper portion of the inner sense linkage and the lower portion of the inner sense linkage.

12. The method of claim 10, wherein each inner sense linkage further comprises:
    a second torsion spring coupled between the upper portion of the inner sense linkage and the lower portion of the inner sense linkage and opposite the first torsion spring; and having a middle portion coupled to the central torsion flexure at a location between the first end of the central torsion flexure and the second end of the central torsion flexure;

wherein, when the upper and lower portions of the inner sense linkage move in phase with each other along an axis parallel to the central torsion flexure and the upper and lower portions of the inner sense linkage are displaced by a predetermined distance, the second torsion spring is configured to strike one or both of the upper portion of the inner sense linkage and the lower portion of the inner sense linkage.

13. The method of claim 12 wherein each inner sense linkage further comprises:
- a first lateral flexure oriented perpendicular to the central torsion flexure that couples the first end of the central torsion flexure to a mass corresponding to the upper portion of that inner sense linkage; and
- a second lateral torsion flexure oriented perpendicular to the central torsion flexure that couples the second end of the central torsion flexure to a mass corresponding to the lower portion of that inner sense linkage;
- wherein each lateral flexure has first and second arms that include respective folded springs;
- wherein a middle portion of each folded spring of the first lateral flexure is coupled to the first end of the central torsion flexure and outer portions of each folded spring of the first lateral flexure are coupled to the mass corresponding to the upper portion of that inner sense linkage; and
- wherein a middle portion of each folded spring of the second lateral flexure is coupled to the second end of the central torsion flexure and outer portions of each folded spring of the second lateral flexure are coupled to the mass corresponding to the lower portion of that inner sense linkage.

14. The method of claim 10, further comprising:
- forming a first outer sense linkage that is coupled to second outer edges of the first mass and the second mass; and
- forming a second outer sense linkage that is opposite the first outer sense linkage and coupled to second outer edges of the third mass and the fourth mass;
- wherein each outer sense linkage comprises:
  - a central portion anchored to the substrate via an anchor that is surrounded by the central portion;
  - a first outer portion having a distal portion anchored to the substrate and a proximal end coupled to the central portion via a first spring element; and
  - a second outer portion having a distal portion anchored to the substrate and a proximal end coupled to the central portion via a second spring element.

15. The method of claim 14,
wherein the first outer portion of the first outer sense linkage is coupled to the first mass via the first spring element of the first outer sense linkage and the second outer portion of the first outer sense linkage is coupled to the second mass via the second spring element of the first outer sense linkage;

wherein the first outer sense linkage is configured to exhibit a first stiffness value in response to out-of-phase motion of the first mass with respect to the second mass; and wherein the first outer sense linkage is configured to exhibit a second stiffness value that is greater than the first stiffness value in response to in-phase motion of the first mass with respect to the second mass.

16. The method of claim 15,
wherein the first outer portion of the second outer sense linkage is coupled to the third mass via the first spring element of the second outer sense linkage and the second outer portion of the second outer sense linkage is coupled to the fourth mass via the second spring element of the second outer sense linkage;

wherein the second outer sense linkage is configured to exhibit a third stiffness value in response to out-of-phase motion of the third mass with respect to the fourth mass; and wherein the second outer sense linkage is configured to exhibit a fourth stiffness value that is greater than the third stiffness value in response to in-phase motion of the third mass with respect to the fourth mass.

17. The method of claim 16,
wherein the first second stiffness value is at least 4 times greater than the first stiffness value.

18. The method of claim 17,
wherein the fourth stiffness value is at least 4 times greater than the third stiffness value.

* * * * *